United States Patent [19]

Woram et al.

[11] 4,428,551
[45] Jan. 31, 1984

[54] TOW PLATE FOR AERIAL CARGO DELIVERY

[75] Inventors: Bryon L. Woram, Stevensville, Canada; James M. Hall, Mary Esther, Fla.

[73] Assignee: Metric Systems Corporation, Fort Walton Beach, Fla.

[21] Appl. No.: 345,679

[22] Filed: Feb. 4, 1982

[51] Int. Cl.³ .......................... B64D 1/02; B64D 17/38
[52] U.S. Cl. ............................. 244/137 R; 294/83 A; 294/83 AA
[58] Field of Search .......... 244/137 R, 137 L, 151 B; 294/83 R, 83 A, 83 AA, 83 AB

[56] References Cited

U.S. PATENT DOCUMENTS

| | | | |
|---|---|---|---|
| 3,065,011 | 11/1962 | Pew | 294/83 R |
| 3,357,372 | 12/1967 | Bader | 244/137 L |
| 3,801,051 | 4/1974 | Hosterman et al. | 244/137 L |

FOREIGN PATENT DOCUMENTS 2042435  8/1980  United Kingdom ............ 244/137 L

Primary Examiner—Trygve M. Blix
Assistant Examiner—Rodney Corl
Attorney, Agent, or Firm—Wigman & Cohen

[57] ABSTRACT

A tow plate assembly for an aerial cargo parachute delivery system is disclosed. The tow plate assembly includes an extraction clevis member connected between at least one extraction parachute and a cargo load and a drogue jettison clevis member mounted on the extraction clevis and connected to a drogue parachute. Remote operating linkages are provided for mechanically releasing the clevis members to extract the load or, in the case of an aborted mission, to jettison the drogue parachute. Both clevis members are releasably retained on the tow plate by mechanisms constructed to minimize the force required for release, the extraction clevis by a ball locking device and the drogue jettison clevis by a combination of anti-friction bearings and clevis structure to maintain a minimum vertical component of the drag force acting on the drogue clevis locking elements.

11 Claims, 13 Drawing Figures

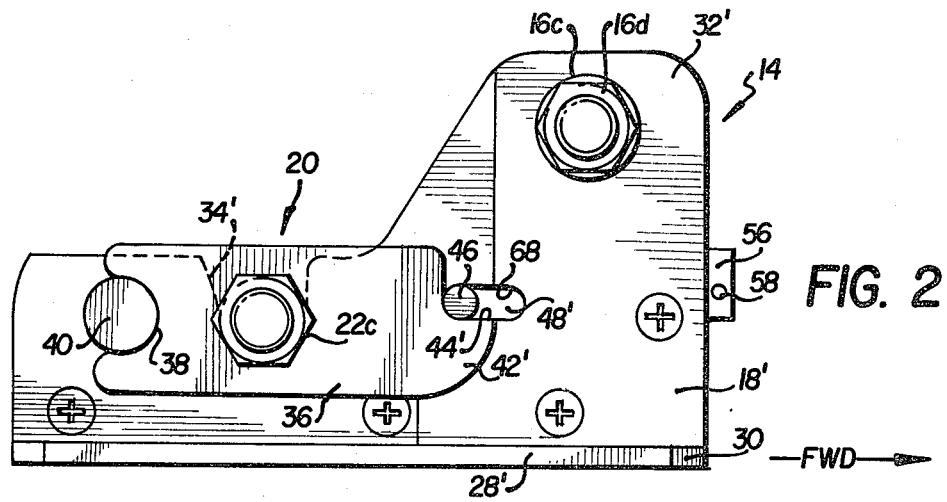
FIG. 2
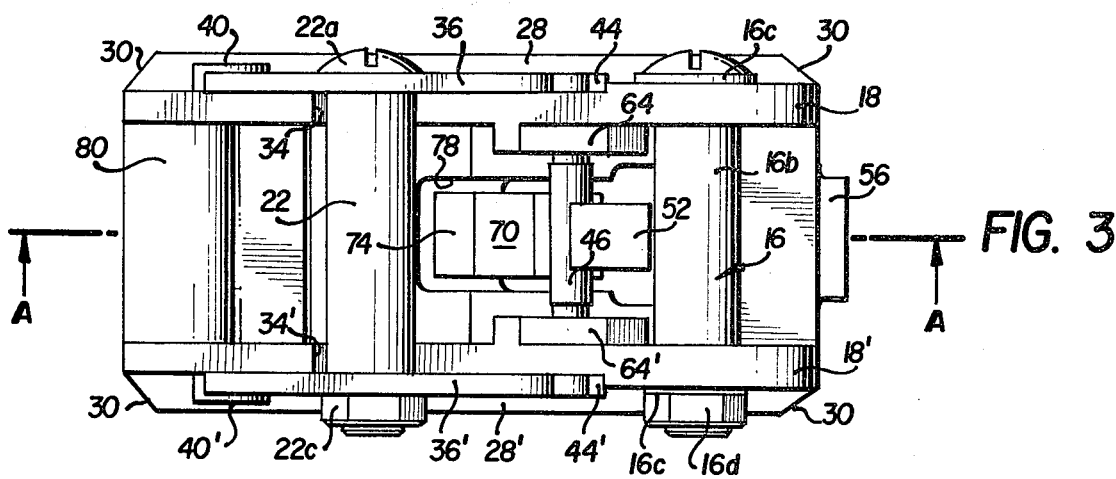
FIG. 3
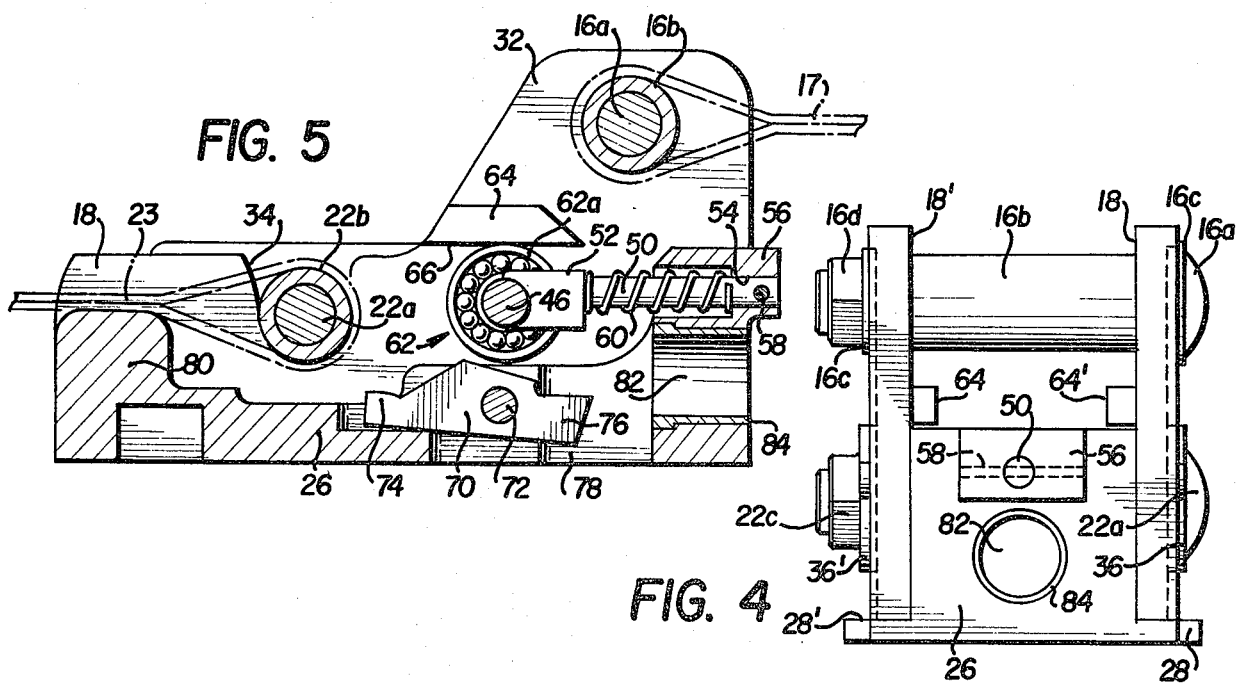
FIG. 5
FIG. 4

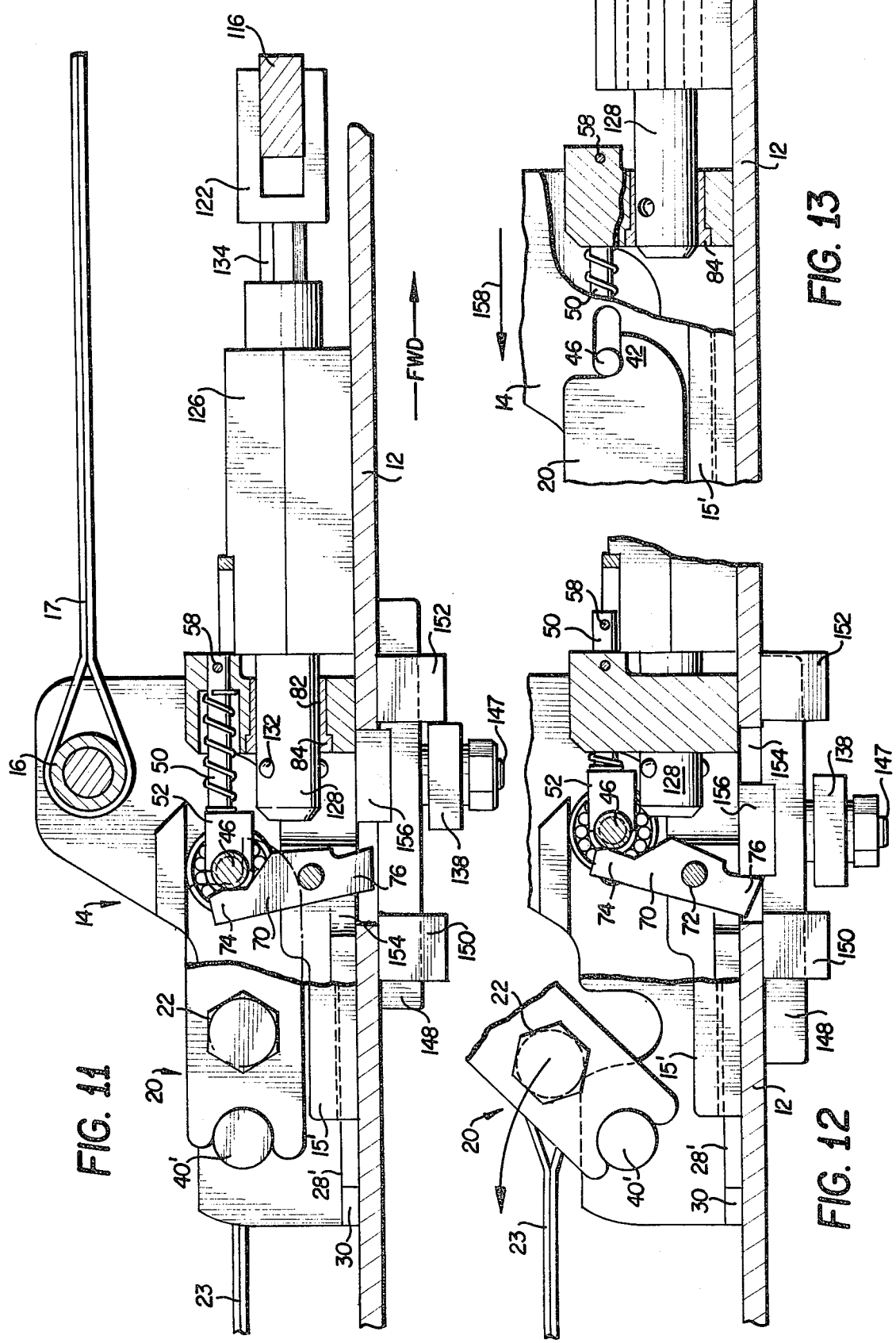

TOW PLATE FOR AERIAL CARGO DELIVERY

BACKGROUND OF THE INVENTION

The present invention relates to aerial cargo delivery systems and more particularly to a tow plate used in a low altitude parachute extraction system (LAPES).

A search of the prior art failed to uncover any prior art references which disclose an aerial cargo delivery system employing the tow plate of the present invention. A number of patents were uncovered which disclose various aerial delivery equipment, including tow plate devices, for use in systems for aerial delivery of cargo, such as LAPES, and platform aerial delivery systems (PADS). The following is a listing of the patents uncovered during the aforementioned search:

| U.S. Pat. No. | Patentee | Issue Date |
| --- | --- | --- |
| 3,257,089 | Samms | 6/21/66 |
| 3,398,917 | Grabe | 8/27/68 |
| 3,401,905 | Rohrlick | 9/17/68 |
| 3,424,410 | Galaup | 1/28/69 |
| 3,425,739 | Frost et al | 2/4/69 |
| 3,642,235 | Criley et al | 2/15/72 |
| 3,670,999 | Leger | 6/20/72 |
| 3,724,788 | Petry et al | 4/3/73 |
| 3,781,055 | Keich et al | 12/25/73 |
| 3,801,051 | Hosterman et al | 4/2/74 |
| 3,865,333 | Fielding et al | 2/11/75 |
| 4,241,890 | Pearson | 12/30/80 |
| 4,303,213 | Bolender et al | 12/1/81 |
| British Patent No. 972,546; 10/14/64 | | |
| French Patent No. 1,234,282; 10/17/60 | | |
| French Patent No. 2,357,419; 2/3/78 | | |

The low altitude parachute extraction system (LAPES) is the most accurate and versatile method of aerial cargo delivery. It may be used to deliver most types of cargo with pinpoint precision and minimum expense from a cargo aircraft having a rear-opening cargo compartment, such as the C-130 Hercules, C-212 Aviocar, DHC-4 Caribou and DHC-5 Buffalo. The most notable distinction between the LAPES system and the PADS system is that no recovery parachutes are employed in the LAPES system.

According to the LAPES method, upon approach to the cargo extraction zone, a drogue parachute, which is usually attached to a tow plate clevis, is deployed from the rear opening of the aircraft cargo compartment. When the extraction zone is reached, the aircraft descends to a delivery height of about 5-10 ft. above the ground and the drogue parachute is deployed. Upon activation of the tow plate control, the force of the inflated drogue parachute is transferred, via an extraction clevis, to the extraction parachute(s) which, in turn, pulls the load platform from the aircraft rear opening.

The platform contacts the ground and decelerates to a stop under the combined forces of ground friction and the drag of the extraction parachute(s). In the event a LAPES aerial delivery is aborted for any reason prior to extraction of the cargo, means are provided for jettisoning the drogue parachute.

Of the above-listed patents, U.S. Pat. Nos. 3,801,051 and 4,303,213 to Hosterman et al and Bolender et al, respectively, disclose tow plates intended for use in a LAPES aerial delivery system of the type contemplated for the present invention. As explained in the Bolender et al patent, the capability of a tow plate device to rapidly, reliably and safely jettison the drogue parachute, as well as release the extraction clevis, is of critical importance in accomplishing a LAPES aerial delivery mission.

One of the difficulties inherent in the LAPES cargo delivery method is the existence of a large drag force which is transferred from the inflated drogue parachute to the extraction clevis and the drogue jettison mechanism. That drag force creates substantial frictional forces between the movable release components of the tow plate, which frictional forces must be overcome to effect operation of either the extraction clevis or the drogue jettison mechanism.

While some measure of improvement has been made in reducing the detrimental effect on the reliability and safety of the LAPES system caused by the aforementioned difficulties, further improvement is needed in the reduction of the frictional forces which are detrimental to reliable operation of the release components. In addition, the tow plate and clevis structures heretofore in use are of large, bulky or relatively complex construction and employ various configurations of roller bodies and curved surfaces intended to reduce the effects of the frictional forces transmitted from the drogue parachute. Moreover, the roller bodies of those tow plates are mounted directly upon their support shafts and constitute friction bearing mountings.

SUMMARY AND OBJECTS OF THE INVENTION

In view of the foregoing limitations and shortcomings of the prior art devices, as well as other disadvantages not specifically mentioned above, it should be apparent that there still exists a need in the art for a safe and reliable LAPES tow plate device which is operable to release the extraction clevis or jettison the drogue parachute by the application of a minimum mechanical force.

It is, therefore, a primary objective of this invention to fulfill that need by providing a novel tow plate installation for aerial delivery of cargo and especially for LAPES missions, in which a drogue jettison clevis and an extraction clevis can be reliably and safely released with the application of a minimum force.

More particularly, it is an object of the present invention to provide an aerial delivery tow plate assembly comprising an extraction clevis which, after release from the tow plate assembly, is positively guided along a path of travel substantially parallel to the longitudinal axis of the aircraft in response to the drag force of the drogue parachute to effect extraction of the load by means of one or more extraction parachutes.

It is another object of the invention to provide a tow plate assembly comprising an extraction clevis upon which is supported a drogue jettison clevis or "no-go" assembly connected to a drogue parachute, such assembly, upon release, being movable in an arcuate path of travel about a pivot axis on the extraction clevis.

Yet another object of the invention is to provide a tow plate assembly for a LAPES system which is characterized by simplicity of construction and high reliability and safety of operation.

Still another object of the present invention is to provide a reliable tow plate assembly wherein all movable components of the assembly are mechanically operated without the need for any electrical or hydraulic operators or back-up systems.

It is another object of the invention to provide a tow plate assembly having a drogue jettison clevis mechanism which is manually operable by the loadmaster or an aircrew member to release the drogue parachute by the application of a remarkably low mechanical force.

Briefly described, the aforementioned objects are accomplished according to the invention by providing a tow plate installation for a cargo aircraft with a rear-opening cargo door/ramp, the tow plate installation including a base adapted to be secured to the aircraft floor structure along the aircraft centerline immediately forward of the hinge of the rear door/ramp. An extraction clevis is slidably mounted for longitudinally guided movement on the tow plate base by a pair of L-shaped guide brackets and is releasably retained to the tow plate by a ball locking device. The extraction clevis comprises a pair of spaced, vertical side plates which support a transverse pin to which one or more load extraction parachutes is secured.

A drogue jettison clevis or "no-go" assembly is pivotally and releasably mounted straddling the side plates of the extraction clevis and carries a transverse pin to which a drogue parachute is secured by a strap. The forward end of the drogue jettison clevis is latched to the extraction clevis by a movable locking shaft. The drogue jettison clevis is adapted to be released from the extraction clevis by means of a manually-operated mechanical control mechanism which urges the locking shaft forwardly out of locking engagement with a pair of locking fingers provided on the forward end of the drogue jettison clevis.

The locking shaft for the drogue jettison clevis is retained in its locked position by a release bar which is guided in a longitudinal bore on the extraction clevis and is secured against movement by a shear wire. The shear wire is severed when the drogue release mechanism is operated.

The primary purpose of the shear wire is to prevent jettisoning of the drogue parachute by reason of release of the drogue clevis locking shaft in response to acceleration of the extraction clevis when the latter is released from the tow plate during normal LAPES operation. The shear wire also establishes the magnitude of force required to jettison the drogue parachute.

Both the extraction clevis and the drogue jettison clevis are operated by mechanical linkages pivotally mounted to the tow plate base and actuable by a pair of longitudinally movable control cables or rods secured respectively to a LAPES handle located on the aircraft flight deck, for instance, adjacent the co-pilot's seat and a drogue release handle situated in the cargo compartment adjacent the loadmaster's station.

According to the present invention, the two clevis assemblies are especially designed and constructed in a novel manner to minimize the forces required to release either assembly. The ball locking device which secures the extraction clevis to the tow plate base along a single longitudinal axis, provides unparalleled low-friction operation and ease of maintenance and is substantially malfunction-free. Suitable ball locking devices for use in the present invention are commercially available mechanisms. One such device, known as BALL-LOK, is manufactured and sold by Avibank Manufacturing of Burbank, Calif. under the part number designation 55019. Ball locking devices are used in a variety of applications, such as securing stores beneath an aircraft and the like. See, e.g., U.S. Pat. Nos. 3,645,482; 3,883,097; 3,887,150; and 4,120,232.

With respect to the drogue jettison clevis, the axis about which that clevis pivots and the axis of the transverse pin to which the drogue parachute is connected are advantageously arranged in the same horizontal plane. The drag force of the drogue parachute acting upon the drogue jettison clevis through the drogue parachute attached to the transverse pin generates only a slight upward rotational force component whereby there results a minimum of sliding friction between the locking shaft and the locking fingers on the forward end of the drogue jettison clevis.

To ensure that the drag force on the drogue parachute strap does create a slight upward force component and does not act along a line which might create a downward rotational force on the drogue jettison clevis and thus prevent its upward rotation when the drogue parachute jettison mechanism is operated, stop or abutment means are provided on the extraction clevis base upon which the parachute strap bears. The top or bearing surface of the abutment means is preferably arranged substantially in the horizontal plane of the aforesaid pivot axes. By means of such arrangement, the drag force has an effective moment arm of one-half the drogue parachute strap thickness.

In addition to the above-described measures intended to minimize the force necessary to jettison the drogue parachute, a further anti-friction feature of the invention comprises the provision of roller bearings axially mounted on opposite ends of the locking shaft confronting the inner surfaces of the extraction clevis side plates. The outer ring of each roller bearing bears upon the underside of a shoulder extending in cantilevered fashion from a respective inner surface of the side plates of the extraction clevis and any upward force applied to the locking shaft acts on the shoulders through the anti-friction bearings.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2 is a side elevation view of the extraction clevis of the invention illustrating the drogue jettison clevis mounted thereon in the retention position;

FIG. 3 is a top view of the extraction clevis shown in FIG. 2;

FIG. 4 is an elevation view of the right-hand or forward end of the extraction clevis of FIG. 2;

FIG. 5 is a vertical cross-sectional view of the extraction clevis of the invention taken along line A—A of FIG. 3;

FIG. 11 is a fragmentary side elevation view, partly in cross-section, illustrating the clevis components of the tow plate assembly in their retention positions;

FIG. 12 is a fragmentary side elevation view, partly in cross-section, illustrating the clevis components with the drogue jettison clevis rotating toward the jettison position; and FIG. 13 is a fragmentary cross-sectional view illustrating the release of the extraction clevis from the tow plate ball locking device.

DETAILED DESCRIPTION OF A PREFERRED EMBODIMENT

Figure 1:
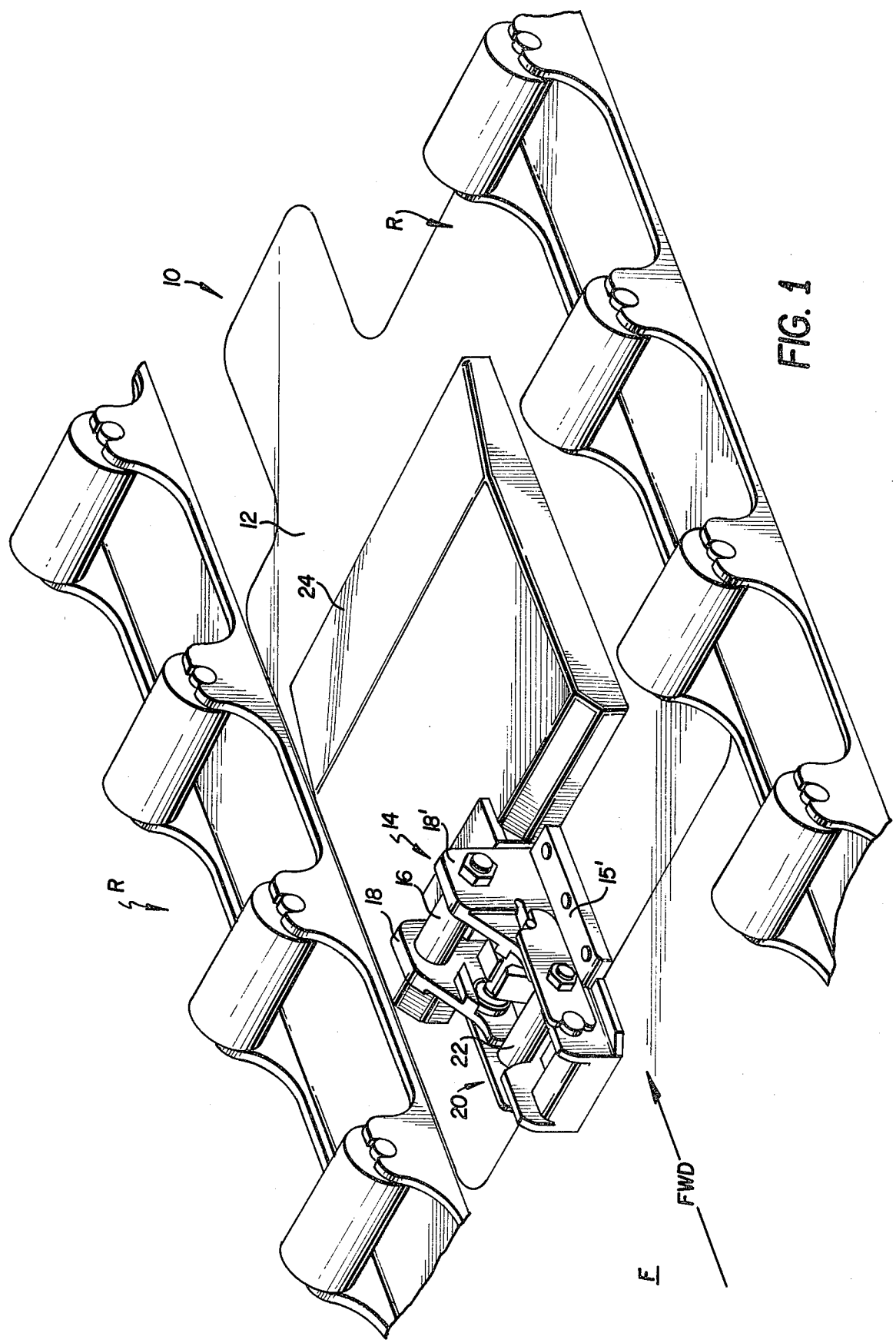
FIG. 1 is a perspective view of a tow plate assembly according to the present invention shown arranged between the inner pair of roller conveyors of a cargo roller/restraint system.

Referring now in detail to the drawings wherein like parts are designated by like reference numerals throughout, there is illustrated in perspective in FIG. 1 a tow plate assembly for an aerial cargo delivery system designated generally by reference numeral 10. The tow plate assembly 10 has a base 12 which is secured to the floor F of the aircraft along the longitudinal centerline thereof between the innermost pair of cargo roller conveyors R.

At the rearward or aft end of the tow plate base, there is mounted a releasable extraction clevis element 14 which is slidable in L-shaped guide brackets 15, 15' along a longitudinal fore-and-aft axis. Rearward movement of the clevis element 14 from its retained position shown in FIG. 1 to a released position completely detached from the guide brackets 15, 15' of the tow plate assembly is effected in response to the drag force of a drogue parachute (not shown) secured to the extraction clevis 14 in a manner to be described hereinafter. One or more extraction parachutes (not shown) for pulling or extracting the load from the aircraft is attached to an extraction clevis pin or bolt 16 securely fastened between a pair of spaced vertical side plates 18, 18' of the extraction clevis 14.

Straddling the rearward end of the side plates 18, 18' of the extraction clevis 14 is a drogue jettison clevis or "no-go" assembly 20 having a transverse clevis pin or bolt 22 to which the aforementioned drogue parachute is adapted to be fastened. The drogue jettison clevis 20 is releasable from the tow plate assembly 10 independently of the extraction clevis 14, for instance, in an emergency or whenever it is necessary to abort the cargo delivery mission after deployment of the drogue parachute.

One of the significant advantages of the present tow plate invention is that both the extraction clevis and the drogue jettison clevis are entirely mechanically constructed and operated and do not depend upon the operation of any electrical, pneumatic or hydraulic system or component. The mechanical elements and linkages for operating the two clevis devices of the invention are arranged beneath and protected by a tow plate housing or cover 24 and the tow plate base 12.

Referring now to FIGS. 2–5, the extraction clevis member 14 comprises spaced vertical side plates 18, 18' secured together along the lower edges thereof by a clevis base member 26 to form a generally U-shaped clevis frame. Extending outwardly from the clevis base 26 beyond the lowermost edges of the clevis side plates 18, 18' are longitudinal guide flanges 28, 28' having beveled surfaces 30 at the forward and rear ends thereof. The forward ends of the side plates 18, 18' have upwardly extending portions 32, 32' between which the transverse extraction clevis pin 16 is secured. The pin 16 comprises a threaded bolt 16a and a tubular bushing 16b fastened to the side plates with lock washers 16c and a self-locking nut 16d. One or more extraction parachutes (not shown) is secured to the clevis pin 16 by means of a strap 17 shown in phantom in FIG. 5.

At the upper edge of the rear portion of each side plate 18, 18', there is provided a U-shaped notch 34, 34' which receives the clevis pin 22 of the drogue jettison clevis 20. Clevis pin 22 has a construction similar to the clevis pin 16 and comprises a threaded bolt 22a and a tubular bushing 22b secured to the drogue clevis side plates 36, 36' by a self-locking nut 22c. A drogue parachute (not shown) is adapted to be secured to the clevis pin 22 by a strap 23 shown in phantom in FIG. 5.

The rear ends of the drogue clevis side plates 36, 36' are provided with semi-circular cut-outs 38 which pivotally bear upon a respective cylindrical pivot boss 40, 40' protruding outwardly from the extraction clevis side plates 18, 18'. The forward ends of the drogue clevis side plates 36, 36' are provided with locking fingers 42, 42' formed by horizontal surfaces 44, 44' which engage the underside of a movable locking shaft 46.

Locking shaft 46 extends transversely between a pair of elongated, horizontal slots 48, 48' in the side plates 18, 18' and is movable fore-and-aft in the slots from a rearmost locking position as shown in FIG. 2 to a forwardmost unlocked position in which the locking shaft 46 is disengaged from the horizontal surfaces 44, 44' of the locking fingers 42, 42'. As best shown in FIGS. 3 and 5, the locking shaft 46 is held in the illustrated locked position by a release bar 50, the rear end of which has a head 52 which engages a central semi-cylindrical portion of the locking shaft 46.

The release bar is supported in a stepped-diameter bore 54 extending longitudinally through an embossment 56 formed in the forward end of the clevis base member 26 and is held in place by a shear wire 58 passing through aligned holes in the embossment 56 and release bar 50. A helical spring 60 is mounted about the release bar shaft 50 and is arranged to urge the head 52 of the release bar to the left or rearwardly for the purpose of retaining the locking shaft 46 in the drogue clevis locking position during assembly of the clevis components. When the shear wire 58 is inserted through the embossment and release bar, the spring 60 performs no further significant function.

A pair of anti-friction roller bearings 62 are mounted on the locking shaft 46 in axially spaced relation adjacent a respective side plate 18, 18'. Each roller bearing is positioned beneath a respective shoulder 64, 64' extending in cantilevered fashion from the inner surfaces of the side plates 18, 18'. The outer rings 62a of the bearings bear upwardly in rolling relationship with the lowermost surfaces 66 of the cantilevered shoulder 64, 64'.

The purpose of the anti-friction bearings 62 is to eliminate the sliding friction between the top of the locking shaft 46 and the upper surfaces 68 of the horizontal slots 48, 48' in the side plates 18, 18' so that the only sliding friction which retards forward movement of the locking shaft 46 is the friction between the bottom of the locking shaft 46 and the upper surfaces 44, 44' of the locking fingers 42, 42'.

It will be appreciated by those skilled in the art that, by providing appropriate dimensions and tolerances of the aforementioned components, any upward or counterclockwise rotational force transmitted to the drogue clevis 20 from an inflated drogue parachute via the drogue parachute strap 23 will act upwardly through the locking fingers 42, 42', the locking shaft 46, the roller bearings 62, the shoulders 64, 64' and the side plates 18, 18'. That arrangement of force application is readily accomplished by dimensioning the vertical height of the slots 48, 48' so that at the tolerance condition of minimum distance between the upper surface of the locking shaft 46 and the shoulder surfaces 66, no contact occurs between the upper side of the locking shaft and the upper edge 68 of the slots 48, 48'.

A release lever 70 is pivotally mounted to the clevis base member 26 by a shaft 72 and is pivotable clockwise from the position shown in FIG. 5 such that an upper tab 74 of the lever 70 is engageable with the locking shaft 46 on the side thereof opposite the head 52 of the release air 50. See, e.g., FIG. 11. In that position, a lower tab 76 of the lever 70 extends generally downwardly through an aperture 78 in the clevis base 26. The lower tab 76 is adapted to be engaged by the drogue clevis operating linkage as described more fully hereinafter.

To minimize the sliding friction between the locking finger surfaces 44, 44' and the locking shaft 46 when it is desired, for example, to jettison an inflated drogue parachute, the axis about which the drogue jettison clevis rotates, i.e., the axis defined by the pivot bosses 40, 40', is arranged in the same horizontal plane as the axis of the drogue clevis pin 22 when the latter is positioned as shown in FIGS. 2-5. In such arrangement, a drogue parachute drag force acting on the pin 22 in the horizontal plane would theoretically have no vertical or rotational force component to effect counterclockwise pivoting of the clevis 20 and jettisoning of the drogue parachute when the locking shaft 46 is disengaged from the locking fingers, 42, 42'. However, to ensure that a minimum rotational force exists sufficient to effect jettisoning, a stop or abutment means 80 is provided on the rear end of the clevis base member 26 beneath the drogue parachute strap 23. The top surface of the abutment 80 is coincident with the horizontal plane containing the axes of the pivot bosses 40, 40' and the clevis pin 22 thereby establishing a moment arm equal to one-half the thickness of the drogue parachute strap 23. That moment arm ensures the existence of a slight upward or counterclockwise rotational force acting upon the drogue jettison clevis member 20.

Figure 7:
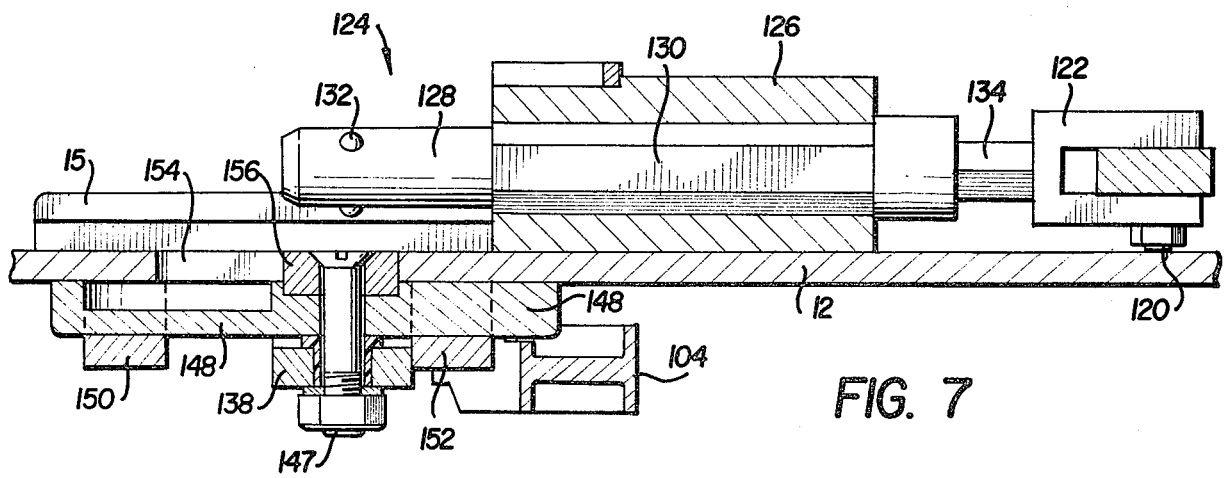
FIGS. 7-10 are fragmentary vertical cross-sectional views taken along lines B—B, C—C, D—D and E—E, respectively.
Figure 8:
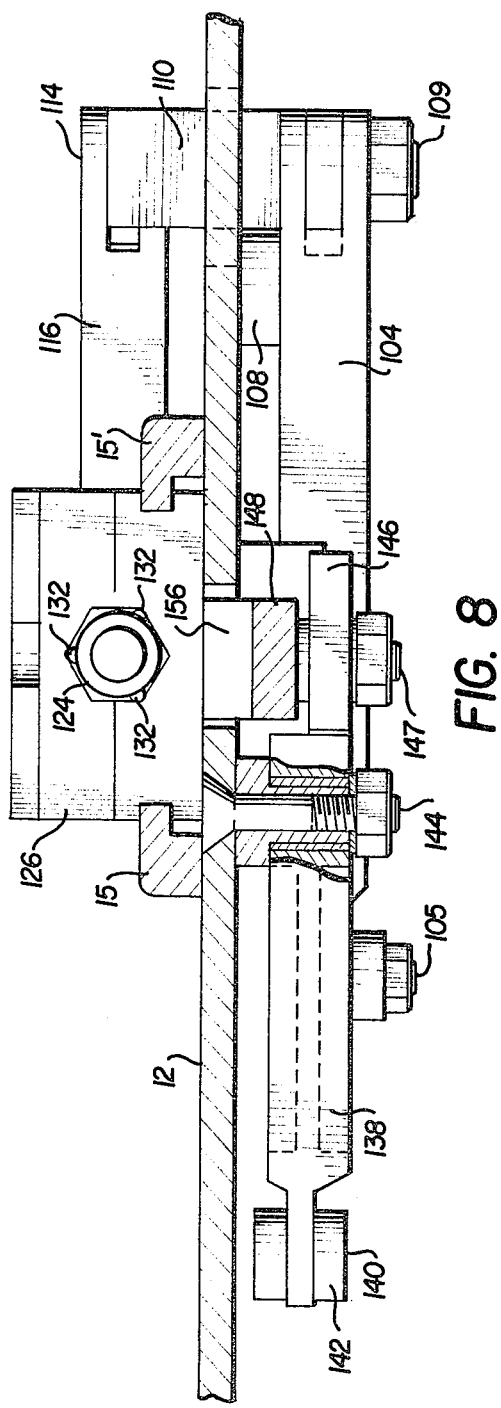
Figure 10:
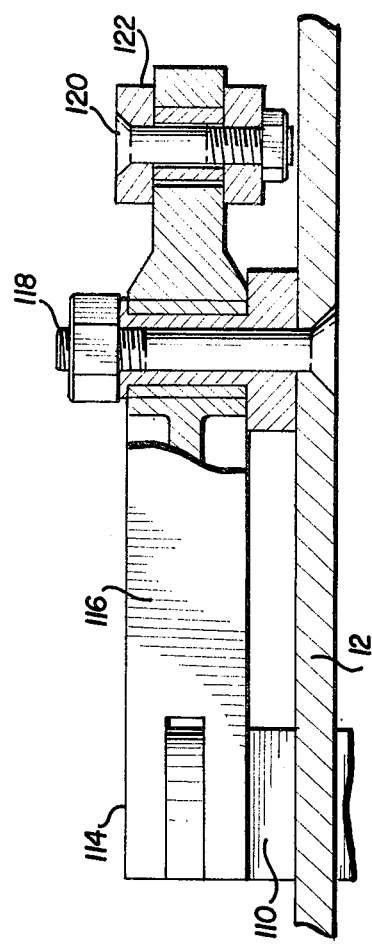
Figure 9:
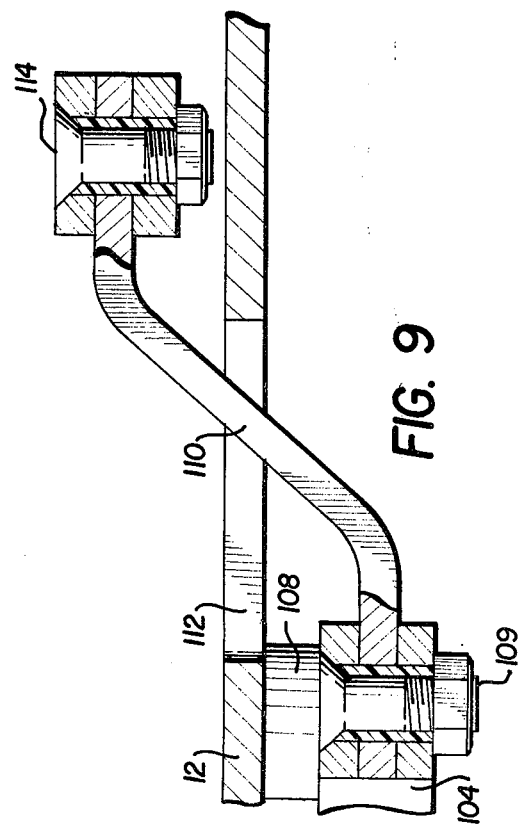

As best seen in FIGS. 4 and 5, the forward end of the clevis base member 26 is provided with a throughbore 82 lined with a bushing 84. The bore 82 receives a ball locking device (FIG. 7) which releasably retains the clevis member 14 to the tow plate base 12.

Figure 6:
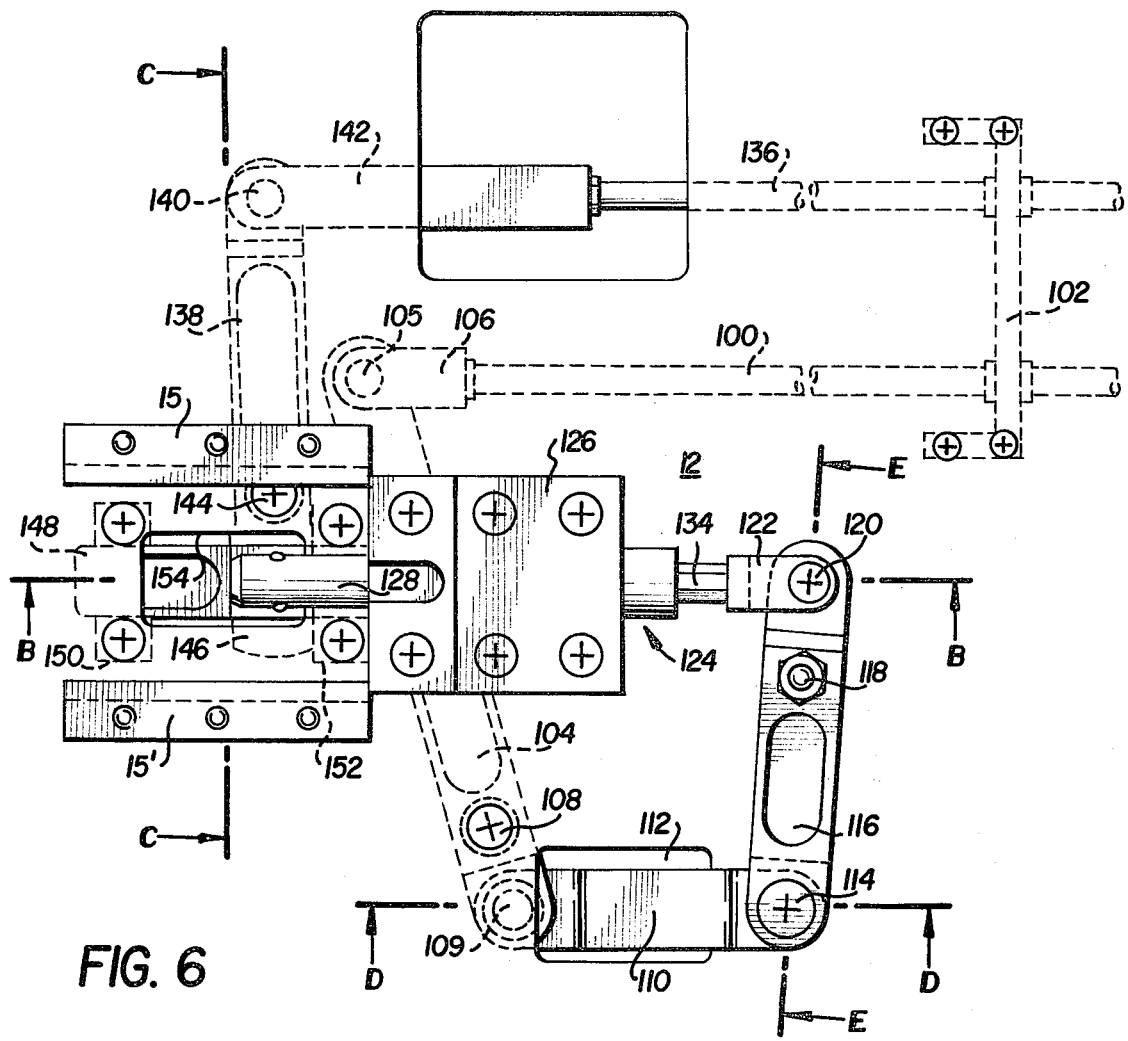
FIG. 6 is a fragmentary top view of a portion of the tow plate assembly of the invention illustrating the various mechanical linkages for operating the extraction clevis and the drogue jettison clevis.

Referring now to FIG. 6 and the cross-sectional details of FIGS. 7-10, the components of the mechanical linkages for the operation of the extraction clevis member 14 and the drogue jettison clevis 20 will be described.

The extraction clevis operating linkage comprises a control cable or rod 100 which extends from an operator element, i.e., a LAPES release handle (not shown), located, for instance, on the flight deck adjacent the co-pilot's seat. The control cable 100 is supported for longitudinal movement on the underside of the tow plate base 12 by a control cable bracket 102 and is pivotally connected to a lever arm 104 at pivot point 105 by a yoke element 106. Lever arm 104 is pivotally mounted to the underside of tow plate base 12 by a pivot 108. At the end thereof opposite the pivot point 105, lever arm 104 is pivotally connected at 109 to a bent linkage element 110.

Linkage element 110 is shaped in such a way as to pass in an inclined direction upwardly through a rectangular aperture 112 in the tow plate base 12. The end of the linkage element 110 situated above the tow plate base 12 is pivotally connected at 114 to another lever arm 116 similar in construction to, but somewhat shorter than, lever arm 104. Lever arm 116 is pivotally connected to the tow plate base 12 at 118 and the end of the lever arm opposite pivot 114 is pivotally connected at pivot point 120 to a yoke element 122. The yoke element 122 is connected to a ball locking device 124 which extends through a two-piece clamping block 126 mounted on the upper surface of the tow plate base 12 forwardly of the location of the extraction clevis 14.

The ball locking device 124 is a conventional device and, in the illustrated embodiment, comprises a BALL-LOK pin manufactured by Avibank Manufacturing, Burbank, Calif. under the part designation 55019. Device 124 comprises a hollow body having a cylindrical portion 128 and a hexagonal portion 130, the latter of which mates with corresponding female surfaces in the body of the two-piece block 126.

A plurality of steel balls 132 protrude from openings arranged in equi-angular spaced relation about the circumference of the hollow cylindrical portion 128 and adjacent the free end thereof. The openings are designed to receive the balls 132 from the hollow inside of the cylindrical portion and to permit them to protrude radially outwardly slightly less than the ball radius. An operating shaft 132 connected to the yoke element 122 extends through the hollow portions 130, 128 and is operative in one longitudinal direction to engage the balls 132 and urge them outwardly to the protruding position shown in FIG. 7 and in the other longitudinal direction to permit the balls to retract radially inwardly to a non-protruding position.

Again referring to FIG. 6, the operating linkage for the drogue jettison clevis comprises a control cable or rod 136 which extends from an operator element, i.e., a drogue release handle (not shown), located, for instance, adjacent the cargo loadmaster's station. The control cable 136 is supported on the underside of the tow plate base 12 by the control bracket 102 and is connected to a lever on 138 at pivot point 140 by a cable lug 142. Lever arm 138 is pivotally mounted to the underside of tow plate base 12 by a pivot 144.

The end 146 of lever arm 138 opposite pivot 140 is pivotally connected at pivot 147 to a slider bar 148 mounted for longitudinal fore-and-aft movement on the underside of tow plate base 12 by a pair of U-shaped brackets 150, 152. A rectangular cut-out 154 is provided in the tow plate base 12 over the slider bar 148 and a release block 156 is mounted on the top surface of the slider bar at pivot 147. Release block 156 extends upwardly into the cut-out 154 so that the top surface thereof is substantially flush with the top surface of the tow plate base 12.

Referring now to FIGS. 11-13, the operation of the tow plate clevis devices will be described. FIG. 11 illustrates the clevis components in their retention positions with one or more extraction parachutes attached to the clevis pin 16 by a strap 17 and an inflated drogue parachute attached to the clevis pin 22 by a strap 23. The drogue jettison clevis 20 straddling the extraction clevis 14 is locked in position by the locking shaft 46, release bar 50, 52 and shear wire 58. The extraction clevis 14 is in its forward retained position with the clevis guide flanges 28, 28' slidably engaged in the L-shaped guide brackets 15, 15'.

Cylindrical end portion 128 of the ball locking device 124 extends through the bushing 84 such that the balls 132 retain the clevis 14 against rearward longitudinal movement. Thus, the operating shaft 134 of the ball locking device 124 is in its rearward position urging the balls 132 into their radially outwardly protruding positions.

Release lever 70 is positioned with the upper tab 74 thereof in contact with the locking shaft 46 on the side thereof opposite the release bar head 52. The lower tab 76 of the lever 70 extending downwardly into cut-out 154 and confronts the rearward face of release block 156. The end of the lever arm 138 at pivot point 147 is located in its forwardmost position.

In the event it becomes necessary to abort a LAPES mission after the drogue parachute has been deployed, the drogue parachute must be jettisoned. With reference to FIGS. 6 and 12, jettison of the drogue parachute is accomplished by operation of the drogue release handle at the loadmaster's station which, in turn, causes the control cable 136 to move forwardly and pivot lever arm 138 clockwise about its pivot point 144. The end 146 of lever arm 138 thus moves rearwardly carrying release block 156 into engagement with the lower tab 76 of release lever 70 and rotates the same clockwise about pivot shaft 72. The upper tab 74 of lever 70 bears against locking shaft 46 and urges it forwardly in slots 48, 48' thereby severing shear wire 58 and disengaging shaft 46 from the locking fingers 42, 42' of the drogue jettison clevis 20. Disengagement of the forward end of the clevis 20 permits the slight upward or rotational component of the drogue parachute drag force to pivot the clevis 20 counterclockwise about pivot bosses 40, 40' to thereby release the drogue parachute into the airstream behind the aircraft.

With reference to FIGS. 6 and 13, a normal LAPES delivery is effected by operation of the LAPES release handle which causes the control cable 100 to move forwardly and urge pivot lever arm 104 clockwise about its pivot point 108. That pivoting movement causes linkage 110 to move aft thereby urging lever arm 116 clockwise about its pivot point 118 and, in turn, moving the pivot 120 and the operating shaft 134 of the ball locking device forwardly.

Forward movement of the operating shaft 134 permits the balls 132 to retract radially inwardly into non-protruding positions in the hollow cylindrical portion 128 of the ball locking device. The extraction clevis 14 is thus permitted to accelerate rearwardly in response to drogue parachute drag to disengage the bushing 84 of the clevis from the ball locking device portion 128 and the clevis guide flanges 28, 28' from the guide brackets 15, 15'. During rearward acceleration of the clevis 14, the shear wire 58 retains the release bar 50 and locking shaft 46 in the locked position shown in FIG. 13 to prevent release of the drogue clevis 20 which might otherwise occur.

Although only a preferred embodiment is specifically illustrated and described herein, it will be appreciated that many modifications and variations of the present invention are possible in light of the above teachings and within the purview of the appended claims without departing from the spirit and intended scope of the invention.

We claim:

1. A tow plate assembly especially for use in an aerial cargo delivery system wherein a load is extracted from a moving aircraft by at least one extraction parachute, comprising a tow plate base, an extraction clevis member adapted to be connected to a load extraction parachute, means for mounting the extraction clevis to the tow plate base for guided longitudinal movement, first releasable means for retaining the extraction clevis to the tow plate base in a retention position, said first releasable means including a ball locking mechanism, a drogue jettison clevis member adapted to be connected to a drogue parachute, means mounting the drogue jettison clevis for arcuate movement about a pivot means on the extraction clevis, second releasable means for retaining the drogue jettison clevis to the extraction clevis in a retention position, means located remotely from said clevis members for selectively and independently operating said first and second releasable means, said second releasable means comprising a locking finger on said drogue jettison clevis, locking shaft means slidably retained on the extraction clevis and engageable with said locking finger for releasably retaining the drogue jettison clevis to the extraction clevis, anti-friction bearing means arranged between said locking shaft and the extraction clevis for reducing the sliding friction therebetween, said second releasable means further comprising a pair of elongated slots arranged in said extraction clevis for slidably receiving said locking shaft, release bar means bearing upon said locking shaft for holding said shaft in position engaging the locking finger of the drogue jettison clevis, a shear wire for locking the release bar means in position and release lever means connected to said remote operating means and engageable with said locking shaft for sliding the same along said slots to thereby sever the shear wire and disengage the locking finger of the drogue jettison clevis.

2. A tow plate assembly especially for use in an aerial cargo delivery system wherein a load is extracted from a moving aircraft by at least one extraction parachute, comprising a tow plate base, an extraction clevis member adapted to be connected to a load extraction parachute, means for mounting the extraction clevis to the tow plate base for guided longitudinal movement, first releasable means for retaining the extraction clevis to the tow plate base in a retention position, said first releasable means including a ball locking mechanism, a drogue jettison clevis member adapted to be connected to a drogue parachute, means mounting the drogue jettison clevis for arcuate movement about a pivot means on the extraction clevis, second releasable means for retaining the drogue jettison clevis to the extraction clevis in a retention position, means located remotely from said clevis members for selectively and independently operating said first and second releasable means, said second releasable means comprising a locking finger on said drogue jettison clevis and a slot in said extraction clevis, locking shaft means slidably retained in the slot on the extraction clevis and engageable with said locking finger for releasably retaining the drogue jettison clevis to the extraction clevis, anti-friction bearing means arranged between said locking shaft and the extraction clevis for reducing the sliding friction therebetween.

3. A tow plate assembly according to claim 2, wherein the drogue jettison clevis includes a drogue clevis pin to which a drogue parachute is adapted to be secured, the axis of the drogue clevis pin and the axis of the drogue clevis pivot means on the extraction clevis being substantially coincident with a plane parallel to the direction of movement of the extraction clevis when the drogue jettison clevis is in the retention position.

4. A tow plate assembly according to claim 2, wherein said means longitudinally guiding said extraction means comprises a pair of parallel flanges extending from said extraction clevis and a pair of guide brackets mounted to the tow plate base in sliding engagement with said flanges.

5. A tow plate assembly according to claim 2, wherein said anti-friction bearing means comprises a pair of rolling bearings arranged on said locking shaft in axially spaced relation, said bearings each including an outer ring, said extraction clevis having a pair of shoulders against which the outer ring of a respective bearing engages in anti-friction rolling relationship.

6. A tow plate assembly according to claim 5, wherein said rolling bearings comprise ball bearings the outer rings of which are rotatable relative to said locking shaft, said shoulders having lowermost surfaces contacted by the outer rings of the bearings.

7. A tow plate assembly according to claim 2, wherein said extraction clevis comprises a base and a pair of spaced side plates connected thereto, an extraction clevis pin extending transversely between said side plates, at least one extraction parachute being adapted to be secured to said extraction clevis pin, said extraction clevis having a bore extending through a portion thereof for receiving the ball locking mechanism of the first releasable means.

8. A tow plate assembly according to claim 2, wherein said remote operating means for the clevis members comprises a plurality of levers pivotally secured to the tow plate base and movable in planes parallel to the tow plate base.

9. A tow plate assembly according to claim 2, wherein said pivot means on the extraction clevis comprises a cylindrical boss and including a semi-circular cut-out on said drogue clevis for engaging said cylindrical boss.

10. A tow plate assembly especially for use in an aerial cargo delivery system wherein a load is extracted from a moving aircraft by at least one extraction parachute, comprising a tow plate base, an extraction clevis member adapted to be connected to a load extraction parachute, means for mounting the extraction clevis to the tow plate base for guided longitudinal movement, first releasable means for retaining the extraction clevis to the tow plate base in a retention position, said first releasable means including a ball locking mechanism, a drogue jettison clevis member adapted to be connected to a drogue parachute, means mounting the drogue jettison clevis for arcuate movement about a pivot means on the extraction clevis and second releasable means for retaining the drogue jettison clevis to the extraction clevis in a retention position, said drogue jettison clevis including a drogue clevis pin to which a drogue parachute is adapted to be secured, the axis of the drogue clevis pin and the axis of the drogue clevis pivot means on the extraction clevis being substantially coincident with a plane parallel to the direction of movement of the extraction clevis when the drogue jettison clevis is in the retention position, a strap for connecting said drogue parachute to said drogue clevis pin, and an abutment on said extraction clevis, said abutment having a surface against which the drogue parachute strap bears, said surface being substantially coincident with the plane containing the axes of the drogue clevis pin and pivot means.

11. A tow plate assembly according to claim 10, including means located remotely from said clevis members for selectively and independently operating said first and second releasable means.

* * * * *